United States Patent [19]
Camp et al.

[11] Patent Number: 5,467,560
[45] Date of Patent: Nov. 21, 1995

[54] WINDOW ASSEMBLY

[75] Inventors: Calvin C. Camp, Bartonville; Jack R. Kaveney, East Peoria; Ronald H. Garman, Pekin; Raymond M. Vanderburg; Malcolm H. Kingsinger, both of Washington, all of Ill.

[73] Assignee: Caterpillar Inc., Peoria, Ill.

[21] Appl. No.: 294,694

[22] Filed: Aug. 23, 1994

[51] Int. Cl.⁶ .................................................. E05D 15/10
[52] U.S. Cl. ................................................ 49/413; 49/404
[58] Field of Search ............................ 49/404, 413, 408, 49/440; 52/204.51, 209

[56] References Cited

U.S. PATENT DOCUMENTS

| | | | |
|---|---|---|---|
| 1,728,344 | 9/1929 | Hellstrand | 49/413 X |
| 4,042,004 | 8/1977 | Kwan | 49/413 X |
| 4,187,642 | 2/1980 | Morinaga et al. | 49/413 X |

FOREIGN PATENT DOCUMENTS 2105770  3/1983  United Kingdom ..................... 49/408

*Primary Examiner*—Peter M. Cuomo
*Assistant Examiner*—Jerry Redman
*Attorney, Agent, or Firm*—Pankaj Khosla

[57] ABSTRACT

A window assembly comprises, a first base member and a second base member, both being of general T-shaped configuration, and having a middle portion and two transversely extending arms. The arms have a longitudinal channel and a plurality of longitudinal slots therein. The middle portion of the second base member is slidably insertable in the longitudinal channel of the first base member. A window assembly further comprises first and second window panes being removably inserted in the longitudinal slots formed in the arms of the first and second base members. A plurality of seals are positioned in the slots and serve to sealingly support the first and second window panes in the respective sots. A seal is also positioned between the second base member middle support and the first base member longitudinal channel and is in sealing engagement therewith. A plurality of plastic blocks are positioned between the first and second base members and are in sliding engagement therewith.

20 Claims, 3 Drawing Sheets

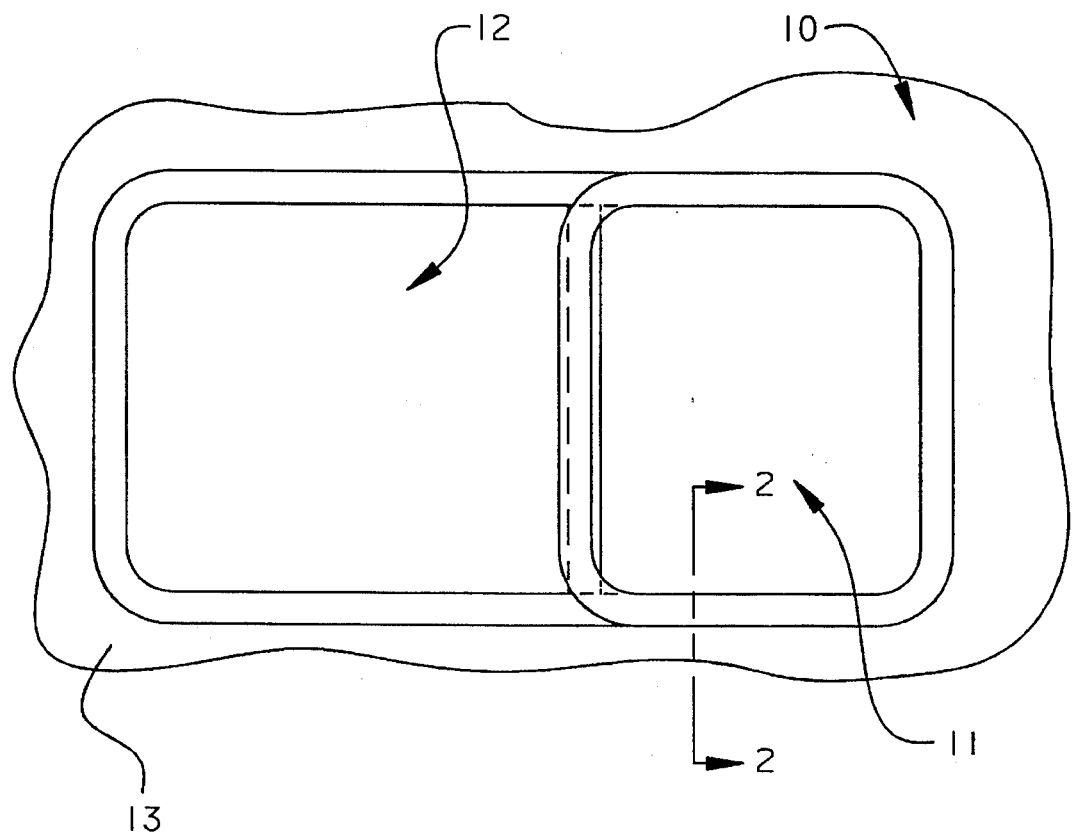
Fig_1_

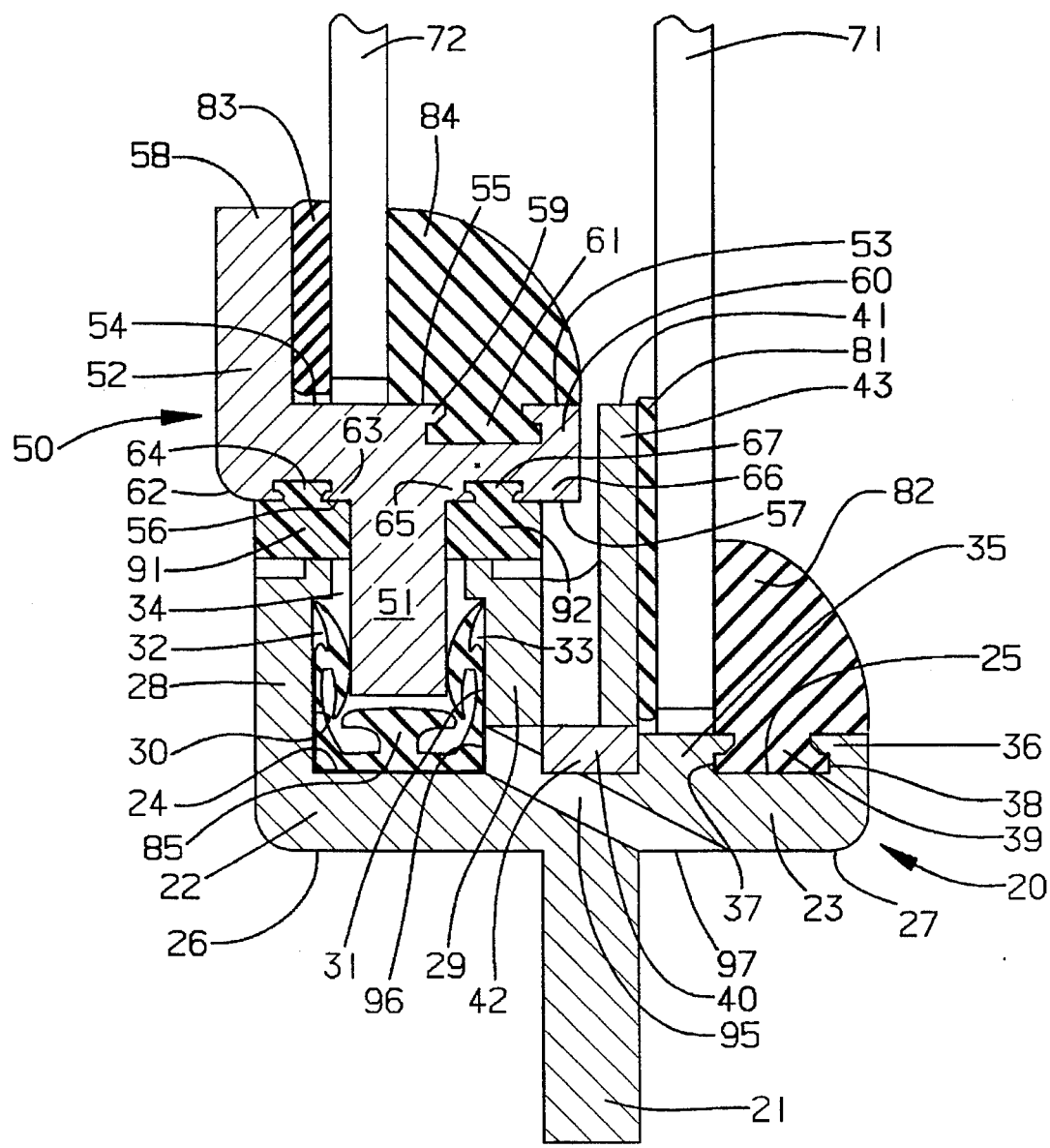

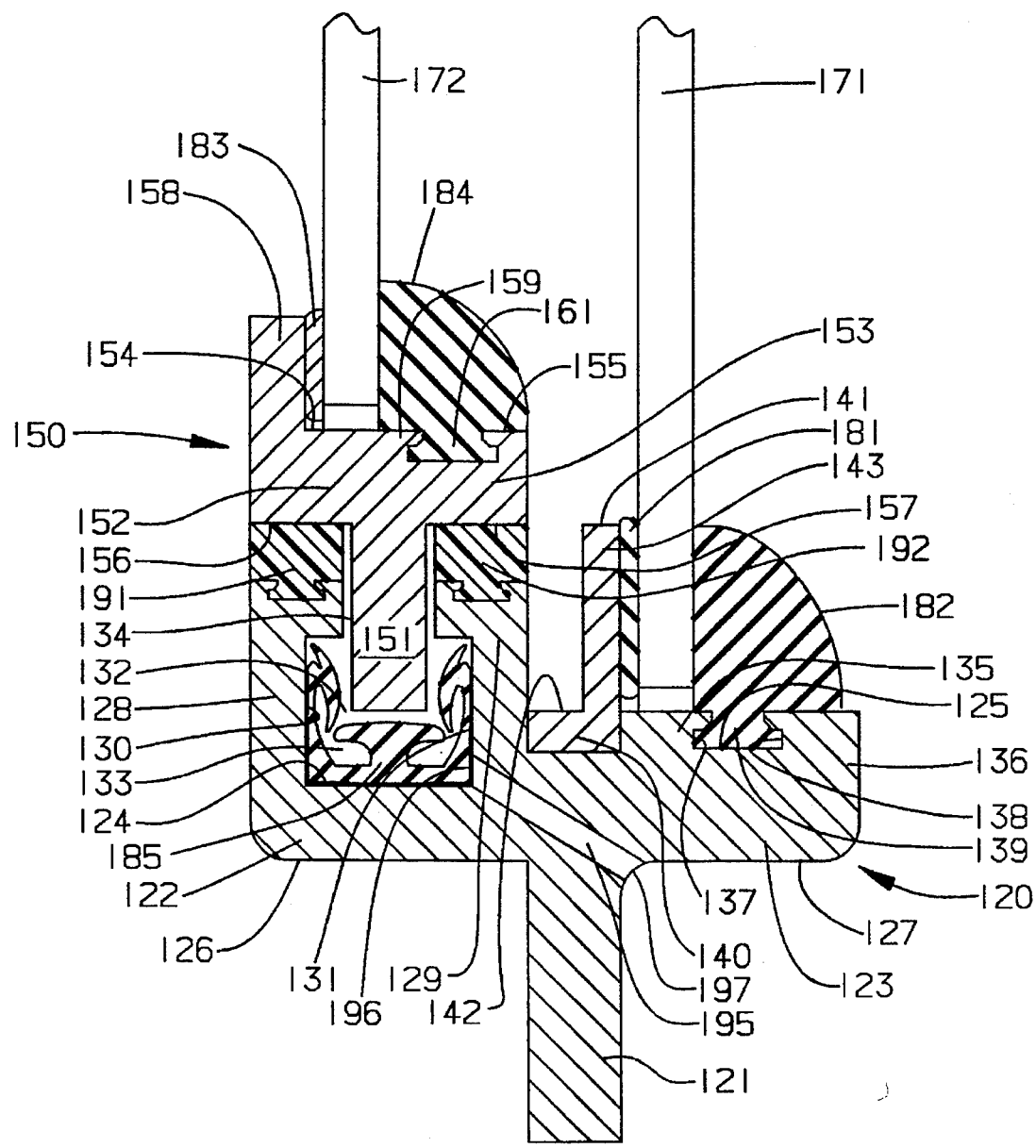
Fig_3_

WINDOW ASSEMBLY

TECHNICAL FIELD

The present invention relates to a window assembly and particularly, to a horizontal sliding window having plastic slide blocks.

BACKGROUND ART

In vehicles, such as tractors, earth movers and the like, the windows in an operator's cab are subject to substantial vibration, dust, debris and other inadvertent forces that tend to make the openability of such windows difficult after a period of time. In slidably opening windows, the dust and debris tends to work its way into the sliding mechanism. The dust and debris along with constant vibration, eventually increases the frictional forces between the sliding part and the stationary part of the window, making it difficult to open.

It is desirable to provide windows in the operator's cab which are easily openable by sliding horizontally. It is also desirable to provide windows wherein the friction coefficient between the sliding portion and the stationary portion is low. It is further desirable that the sliding mechanism be able to withstand dust, debris and vibration and retain a low friction coefficient for a long time. The present invention is directed to overcome one or more of the problems as set forth above.

DISCLOSURE OF THE INVENTION

In one aspect of the invention, a window assembly comprises the following components. A first base member having a middle support, first and second arms, and being of general "T" configuration, each of the arms extending generally transverse the middle support on opposed sides thereof, the first and second arms each having first and second surfaces. First and second spaced apart uprights connected to and extending generally transverse the first surface of the first base member first arm, each of the uprights having an inner surface and a longitudinal slot on the inner surface, and the first and second uprights defining a first longitudinal channel therebetween. Third and fourth spaced apart uprights connected to and extending generally transverse the first surface of the first base member second arm, each of the uprights having an inner surface and an outer surface, and the uprights defining a first longitudinal slot therebetween, and the second and third spaced apart uprights defining a second longitudinal slot therebetween. A fifth upright having a base and an upright member, and being of general "L" configuration, and connected to and extending generally transverse the first surface of the first base member second arm, and insertable in the second longitudinal slot. A second base member having a middle support, first and second arms, and being of general "T" configuration, each of the arms extending generally transverse the middle support on opposed sides thereof, the first and second arms each having first and second surfaces, and the second base member being insertable in the first longitudinal channel. first upright connected to and extending generally transverse the first surface of the second base member first arm. Second and third spaced apart uprights connected to and extending generally transverse the first surface of the second base member second arm, and the uprights defining a first longitudinal slot therebetween. Fourth and fifth spaced apart uprights respectfully connected to and extending generally transverse the second surface of the second base member first arm and second arm. Fourth and fifth longitudinal slots respectfully formed on one of the first and second spaced apart uprights of the first base member first arm, and the fourth and fifth spaced apart uprights of the second base member first arm. A first window pane being supported by the third upright of the first base member second arm at a location spaced from the "L" shaped upright of the first base member. A second window pane being supported by the second upright of the second base member second arm at a location spaced from the first upright of the second base member. A first seal positioned between the first base member fifth upright and the first window pane, and being in sealing engagement therewith. A second seal positioned between the first base member first slot and the first window pane and being in sealing engagement therewith. A third seal positioned between the second base member first upright and the second window pane, and being in sealing engagement therewith. A fourth seal positioned between the second base member first slot and the second window pane and being in sealing engagement therewith. A fifth seal positioned between the second base member middle support and the first base member longitudinal channel and being in sealing engagement therewith. First and second plastic blocks respectfully positioned in the fourth and fifth longitudinal slots, and respectfully being in sliding engagement with one of the first base member first and second uprights, and the second surface of the second base member first and second arms.

BRIEF DESCRIPTION OF THE DRAWINGS

FIG. 1 is a front elevational view of a window assembly embodying the present invention;

FIG. 2 is a cross sectional view taken along the lines 2—2 of FIG. 1, representing one embodiment of the present invention;

FIG. 3 is a cross sectional view taken along the lines 2—2 of FIG. 1, representing a preferred embodiment of the present invention;

BEST MODE FOR CARRYING OUT THE INVENTION

Referring to FIG. 1 of the drawing, a window assembly generally designated 10 illustratively comprises a sliding window assembly having a movable portion 11 and a fixed portion 12. The fixed portion 12 is mounted in an opening in a wall portion 13, such as a wall portion of an operator's cab of an earthmover or a tractor.

Referring to FIG. 2, which shows an embodiment of the present invention, a first base member 20 has a middle support 21, first arm 22 and second arm 23, thus being of a general "T" configuration. The arms 22,23 extend generally transverse the middle support 21 and respectfully have first surfaces 24,25 and second surfaces 26,27.

A first upright 28, and a second upright 29 spaced apart from the first upright, are connected to and extend generally transverse the first surface 24. The uprights 28,29 are connected to the first surface 24 by welding. Alternatively, they may be connected by continuous extrusion of a metal, such as aluminum, for example. The first upright has an inner surface 30 and the second upright has an inner surface 31. Longitudinal slots 32,33 are respectfully formed on the inner surfaces 30,31 of uprights 28,29. The uprights 28,29 define a longitudinal channel 34 therebetween.

A third upright 35, and a fourth upright 36 spaced apart from the third upright, are connected to and extend generally transverse the first surface 25. The uprights 35,36 are connected to the first surface 25 by welding. Alternatively, they may be connected by continuous extrusion of a metal, such as aluminum, for example. The third upright has an inner surface 37 and the fourth upright has an inner surface 38. The uprights 35,36 define a first longitudinal slot 39 therebetween. The second and third spaced apart uprights 29,35 define a second longitudinal slot 40 therebetween.

A fifth upright 41 being of a general "L" configuration and having a base member 42 and an upright member 43 is insertably connected and extends generally transverse the first surface 25.

A second base member 50, having a middle support 51, first arm 52 and second arm 53, thus being of a general "T" configuration. The arms 52,53 extend generally transverse the middle support 51 and respectfully have first surfaces 54,55 and second surfaces 56,57. The second base member 50 is slidably insertable in the first longitudinal channel 34.

A first upright 58 is connected to and extends generally transverse the first surface 54. A second upright 59, and a third upright 60 spaced apart from the second upright, are connected to and extend generally transverse the first surface 55. The uprights 59,60 are connected to the first surface 55 by welding. Alternatively, they may be connected by continuous extrusion of a metal, such as aluminum, for example. The uprights 59,60 define a first longitudinal slot 61 therebetween.

A fourth upright 62, and a fifth upright 63 spaced apart from the fourth upright, are connected to and extend generally transverse the second surface 56. The uprights 62,63 are connected to the second surface 56 by welding. Alternatively, they may be connected by continuous extrusion of a metal, such as aluminum, for example. The uprights 62,63 define a second longitudinal slot 64 therebetween.

A sixth upright 65, and a seventh upright 66 spaced apart from the sixth upright, are connected to and extend generally transverse the second surface 57. The uprights 65,66 are connected to the second surface 57 by welding. Alternatively, they may be connected by continuous extrusion of a metal, such as aluminum, for example. The uprights 65,66 define a third longitudinal slot 67 therebetween.

A first window pane 71 is supported by the third upright 35 at a location spaced from the upright 43. A second window pane 72 is supported by the second upright 59 at a location spaced from the first upright 58. Window panes 71,72 may be made from plexiglass or glass, or other equivalents.

A first seal 81 is positioned between the fifth upright 43 and the first window pane 71 and serves to seal the gap between the window pane and the upright. A second seal 82 is positioned in the first longitudinal slot 39 and seals against the first window pane 71. A third seal 83 is positioned between the first upright 58 and the second window pane 72 and serves to seal the gap between the window pane and the upright. A fourth seal 84 is positioned in the first longitudinal slot 61 and seals against the second window pane 72. Seals 81,83 are made of butyl rubber. Seals 82,84 are made from EPDM rubber. A fifth seal 85 is positioned between the middle support 51 and the longitudinal channel 34 and serves as a resilient seal between the middle support 51 and the longitudinal channel 34. Seal 85 is made from a rubber flocked foam.

A first plastic block 91 and a second plastic block 92 are respectfully positioned in slots 64 and 67 of the second base member 50, and serve as a low friction medium in contact with the surfaces of uprights 28 and 29. This enhances the ease with which the movable portion 11, as shown in FIG. 1, having plastic blocks 91,92 attached thereto, slides upon the fixed portion 12, of the window assembly of FIG. 1. Preferably, the blocks 91,92 are made from nylon. The nylon blocks also serve to support the weight of movable portion 11 of the window assembly 10, as shown in FIGS. 1 and 2. This helps keep the weight off seal 85, thus making it wear longer.

A drain passage 95 extends through the first base member 20. The drain passage 95 has a first opening 96 into the longitudinal channel 34 and a second opening 97 into the second surface 27. The drain passage serves to drain any liquid, such as water from the channel.

Referring now to FIG. 3, which shows a preferred embodiment of the present invention, a first base member 120 has a middle support 121, first arm 122 and second arm 123, thus being of a general "T" configuration. The arms 122,123 extend generally transverse the middle support 121 and respectfully have first surfaces 124,125 and second surfaces 126,127.

A first upright 128, and a second upright 129 spaced apart from the first upright, are connected to and extend generally transverse the first surface 124. The uprights 128,129 are connected to the first surface 124 by welding. Alternatively, they may be connected by continuous extrusion of a metal such as aluminum, for example. The first upright has an inner surface 130 and the second upright has an inner surface 131. Longitudinal slots 132,133 are respectively formed on the inner surfaces 130,131 of uprights 128,129. The uprights 128,129 define a longitudinal channel 134 therebetween. The uprights 128,129 also respectfully have first and second longitudinal slots 164,167 therein.

A third upright 135, and a fourth upright 136 spaced apart from the third upright, are connected to and extend generally transverse the first surface 125. The uprights 135,136 are connected to the first surface 125 by welding. Alternatively, they may be connected by continuous extrusion of a metal, such as aluminum, for example. The third upright has an inner surface 137 and the fourth upright has an inner surface 138. The uprights 135,136 define a third longitudinal slot 139 therebetween. The second and third spaced apart uprights 129,135 define a fourth longitudinal slot 140 therebetween.

A fifth upright 141 being of a general "L" configuration and having a base member 142 and an upright member 143 is insertably connected and extends generally transverse the first surface 125.

A second base member 150, having a middle support 151, first arm 152 and second arm 153, thus being of a general "T" configuration. The arms 152,153 extend generally transverse the middle support 151 and respectfully have first surfaces 154,155 and second surfaces 156,157. The second base member 150 is slidably insertable in the first longitudinal channel 134.

A first upright 158 is connected to and extends generally transverse the first surface 154. A second upright 159, and a third upright 160 spaced apart from the second upright, are connected to and extend generally transverse the first surface 155. The uprights 159,160 are connected to the first surface 155 by welding. Alternatively, they may be connected by continuous extrusion of a metal, such as aluminum, for example. The uprights 159,160 define a first longitudinal slot 161 therebetween.

A first window pane 171 is supported by the third upright 135 at a location spaced from the upright 143. A second window pane 172 is supported by the second upright 159 at a location spaced from the first upright 158. Window panes 171,172 may be made from plexiglass or glass, or other equivalents.

A first seal 181 is positioned between the fifth upright 143 and the first window pane 171 and serves to seal the gap between the window pane and the upright. A second seal 182 is positioned in the fourth longitudinal slot 139 and seals against the first window pane 171. A third seal 183 is positioned between the first upright 158 and the second window pane 172 and serves to seal the gap between the window pane and the upright. A fourth seal 184 is positioned in the first longitudinal slot 161 and seals against the second window pane 172. Seals 181,183 are made of butyl rubber. Seals 182,184 are made from EPDM rubber. A fifth seal 185 is positioned between the middle support 151 and the longitudinal channel 134 and serves as a resilient seal between the middle support 151 and the longitudinal channel 134. Seal 185 is made from a rubber flocked foam.

A first plastic block 191 and a second plastic block 192 are respectfully positioned in slots 164 and 167 of the first base member 120, and serve as a low friction medium, respectfully in contact with the surfaces 156 and 157. This enhances the ease with which the movable portion 11, as shown in FIG. 1, slides upon the fixed portion 12, having plastic blocks 191,192 attached thereto, of the window assembly of FIG. 1. Preferably, the blocks 191,192 are made from nylon. The nylon blocks also serve to support the weight of movable portion of the window assembly 10, of FIGS. 1 and 2. This helps keep the weight off seal 185, thus making it wear longer.

A drain passage 195 extends through the first base member 120. The drain passage 195 has a first opening 196 into the longitudinal channel 134 and a second opening 197 into the second surface 127. The drain passage serves to drain any liquid, such as water from the channel.

INDUSTRIAL APPLICABILITY

The window assemblies of the different embodiments discussed above may be utilized in a wide range of industrial applications wherein it is desirable to provide sliding windows having a sliding mechanism capable of withstanding dust, debris and vibration for a long time.

Thus the window assembly structures of the present invention are advantageously adapted for use in vehicles and the like wherein dust, debris, vibration and other undesirable forces may be directed against the window assembly. The window assemblies are particularly advantageously adapted for use in earthmoving vehicles and the like.

Other aspects, objects and advantages of this invention can be obtained from a study of the drawings, the disclosure and the appended claims.

We claim:

1. A window assembly, comprising:

a first base member having a middle support, first and second arms, and being of general T-shaped, each of said arms extending generally transverse the middle support on opposed sides thereof, said first and second arms each having first and second surfaces;

first and second spaced apart uprights connected to and extending generally transverse said first surface of the first base member first arm, each of said uprights having an inner surface and a longitudinal slot on said inner surface, and said first and second uprights defining a first longitudinal channel therebetween;

third and fourth spaced apart uprights connected to and extending generally transverse said first surface of the first base member second arm, each of said uprights having an inner surface and an outer surface, and said uprights defining a first longitudinal slot therebetween, and said second and third spaced apart uprights defining a second longitudinal slot therebetween;

a fifth upright having a base and an upright member, and being of general L-shaped, and connected to and extending generally transverse said first surface of the first base member second arm, and insertable in said second longitudinal slot;

a second base member having a middle support, first and second arms, and being of general T-shaped, each of said arms extending generally transverse the middle support on opposed sides thereof, said first and second arms each having first and second surfaces, and said second base member being insertable in said first longitudinal channel;

a first upright connected to and extending generally transverse said first surface of the second base member first arm;

second and third spaced apart uprights connected to and extending generally transverse said first surface of the second base member second arm, and said uprights defining a first longitudinal slot therebetween;

fourth and fifth spaced apart uprights respectfully connected to and extending generally transverse said second surface of the second base member first arm and second arm;

fourth and fifth longitudinal slots respectfully formed on one of said first and second spaced apart uprights of the first base member first arm, and said fourth and fifth spaced apart uprights of the second base member first arm;

a first window pane being supported by said third upright of the first base member second arm at a location spaced from said L-shaped upright of the first base member;

a second window pane being supported by said second upright of the second base member second arm at a location spaced from the first upright of the second base member;

a first seal positioned between the first base member fifth upright and the first window pane, and being in sealing engagement therewith;

a second seal positioned between the first base member first slot and the first window pane and being in sealing engagement therewith;

a third seal positioned between the second base member first upright and the second window pane, and being in sealing engagement therewith;

a fourth seal positioned between the second base member first slot and the second window pane and being in sealing engagement therewith;

a fifth seal positioned between the second base member middle support and the first base member longitudinal channel and being in sealing engagement therewith;

first and second plastic blocks respectfully positioned in the fourth and fifth longitudinal slots, and respectfully being in sliding engagement with one of said first base member first and second uprights, and said second surface of the second base member first and second arms.

2. A window assembly, as set forth in claim 1, including at least one drain passage extending through said first base member, said drain passage having a first opening into said first longitudinal channel and into said second surface.

3. A window assembly, as set forth in claim 1, wherein said first, second, third, fourth and fifth seals are made from a resilient elastomer.

4. A window assembly, as set forth in claim 1, wherein said first and second plastic blocks are made from nylon.

5. A window assembly, as set forth in claim 1, wherein said first base member first, second, third, and fourth uprights are fixedly connected to said first base member, and said fifth upright is removably connected to said first base member.

6. A window assembly, as set forth in claim 1, wherein said second base member first, second, third, fourth, and fifth uprights are fixedly connected to said second base member.

7. A window assembly, as set forth in claim 1, wherein said fourth and fifth longitudinal slots are respectfully formed on said first upright of the first base member first arm and the fifth upright of the second base member first arm.

8. A window assembly, as set forth in claim 1, wherein said fourth and fifth longitudinal slots are respectfully formed on said second upright of the first base member first arm and the fourth upright of the second base member first arm.

9. A window assembly, comprising:

a first base member having a middle support, first and second arms, and being of general T-shaped, each of said arms extending generally transverse the middle support on opposed sides thereof, said first and second arms each having first and second surfaces;

first and second spaced apart uprights connected to and extending generally transverse said first surface of the first base member first arm, each of said uprights having an inner surface and a longitudinal slot on said inner surface, and said first and second uprights defining a first longitudinal channel therebetween;

third and fourth spaced apart uprights connected to and extending generally transverse said first surface of the first base member second arm, each of said uprights having an inner surface and an outer surface, and said uprights defining a first longitudinal slot therebetween, and said second and third spaced apart uprights defining a second longitudinal slot therebetween;

a fifth upright having a base and an upright member, and being of general L-shaped and connected to and extending generally transverse said first surface of the first base member second arm, and insertable in said second longitudinal slot;

a second base member having a middle support, first and second arms, and being of general T-shaped, each of said arms extending generally transverse the middle support on opposed sides thereof, said first and second arms each having first and second surfaces, and said second base member being insertable in said first longitudinal channel;

a first upright connected to and extending generally transverse said first surface of the second base member first arm;

second and third spaced apart uprights connected to and extending generally transverse said first surface of the second base member second arm, and said uprights defining a first longitudinal slot therebetween;

fourth and fifth spaced apart uprights connected to and extending generally transverse said second surface of the second base member first arm, and said uprights defining a second longitudinal slot therebetween;

sixth and seventh spaced apart uprights connected to and extending generally transverse said second surface of the second base member second arm, and said uprights defining a third longitudinal slot therebetween;

a first window pane being supported by said third upright of the first base member second arm at a location spaced from said L-shaped upright of the first base member;

a second window pane being supported by said second upright of the second base member second arm at a location spaced from the first upright of the second base member;

a first seal positioned between the first base member fifth upright and the first window pane, and being in sealing engagement therewith;

a second seal positioned between the first base member first slot and the first window pane and being in sealing engagement therewith;

a third seal positioned between the second base member first upright and the second window pane, and being in sealing engagement therewith;

a fourth seal positioned between the second base member first slot and the second window pane and being in sealing engagement therewith;

a fifth seal positioned between the second base member middle support and the first base member longitudinal channel and being in sealing engagement therewith;

first and second plastic blocks respectfully positioned between the second base member second slot and the first base member first upright, and the second base member third slot and the first base member second upright, and being in sliding engagement therewith.

10. A window assembly, as set forth in claim 9, including at least one drain passage extending through said first base member, said drain passage having a first opening into said first longitudinal channel and into said second surface.

11. A window assembly, as set forth in claim 9, wherein said first, second, third, fourth and fifth seals are made from a resilient elastomer.

12. A window assembly, as set forth in claim 9, wherein said first and second plastic blocks are made from nylon.

13. A window assembly, as set forth in claim 9, wherein said first base member first, second, third, and fourth uprights are fixedly connected to said first base member, and said fifth upright is removably connected to said first base member.

14. A window assembly, as set forth in claim 9, wherein said second base member first, second, third, fourth, fifth, sixth, and seventh uprights are fixedly connected to said second base member.

15. A window assembly, comprising:

a first base member having a middle support, first and second arms, and being of general T-shaped, each of said arms extending generally transverse the middle support on opposed sides thereof, said first and second arms each having first and second surfaces;

first and second spaced apart uprights connected to and extending generally transverse said first surface of the first base member first arm, each of said uprights having an inner surface and a longitudinal slot on said inner surface, said first and second uprights defining a first longitudinal channel therebetween, and said first and second uprights respectfully having first and second slots therein;

third and fourth spaced apart uprights connected to and extending generally transverse said first surface of the first base member second arm, each of said uprights having an inner surface and an outer surface, and said uprights defining a third longitudinal slot therebetween, and said second and third spaced apart uprights defining a fourth longitudinal slot therebetween;

a fifth upright having a base and an upright member, and being of general L-shaped, and connected to and extending generally transverse said first surface of the first base member second arm, and insertable in said fourth longitudinal slot;

a second base member having a middle support, first and second arms, and being of general T-shaped, each of said arms extending generally transverse the middle support on opposed sides thereof, said first and second arms each having first and second surfaces, and said second base member being insertable in said first longitudinal channel;

a first upright connected to and extending generally transverse said first surface of the second base member first arm;

second and third spaced apart uprights connected to and extending generally transverse said first surface of the second base member second arm, and said uprights defining a first longitudinal slot therebetween;

a first window pane being supported by said third upright of the first base member second arm at a location spaced from said "L" shaped upright of the first base member;

a second window pane being supported by said second upright of the second base member second arm at a location spaced from the first upright of the second base member;

a first seal positioned between the first base member fifth upright and the first window pane, and being in sealing engagement therewith;

a second seal positioned between the first base member first slot and the first window pane and being in sealing engagement therewith;

a third seal positioned between the second base member first upright and the second window pane, and being in sealing engagement therewith;

a fourth seal positioned between the second base member first slot and the second window pane and being in sealing engagement therewith;

a fifth seal positioned between the second base member middle support and the first base member longitudinal channel and being in sealing engagement therewith;

first and second plastic blocks respectfully positioned in said first and second longitudinal slots of the first base member, and respectfully being in sliding engagement with said second surface of the second base member first and second arms.

16. A window assembly, as set forth in claim 15, including at least one drain passage extending through said first base member, said drain passage having a first opening into said first longitudinal channel and into said second surface.

17. A window assembly, as set forth in claim 15, wherein said first, second, third, fourth and fifth seals are made from a resilient elastomer.

18. A window assembly, as set forth in claim 15, wherein said first and second plastic blocks are made from nylon.

19. A window assembly, as set forth in claim 15, wherein said first base member first, second, third, and fourth uprights are fixedly connected to said first base member, and said fifth upright is removably connected to said first base member.

20. A window assembly, as set forth in claim 15, wherein said second base member first, second, third, fourth, fifth, sixth, and seventh uprights are fixedly connected to said second base member.

* * * * *